United States Patent
Swarup et al.

(10) Patent No.: US 6,476,136 B1
(45) Date of Patent: Nov. 5, 2002

(54) POLYMER COMPOSITIONS DERIVED FROM VINYL NEO $C_9$-$C_{13}$ CARBOXYLIC ACID ESTERS

(75) Inventors: Vijay Swarup, Houston, TX (US); Peter S. Ellis, Houston, TX (US); Henry W. Yang, Kingwood, TX (US); Oliver W. Smith, Petal, MS (US); Thomas H. Henry, Prospect, KY (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/622,748

(22) PCT Filed: Feb. 23, 1999

(86) PCT No.: PCT/US99/03921

§ 371 (c)(1),
(2), (4) Date: Feb. 6, 2001

(87) PCT Pub. No.: WO99/42500

PCT Pub. Date: Aug. 26, 1999

(51) Int. Cl.$^7$ .......................... C08F 18/10; C08L 23/00; C08L 23/04
(52) U.S. Cl. .................. 525/191; 525/222; 525/228; 525/235; 525/238; 525/239; 525/241; 526/318; 526/318.1; 526/318.3; 526/318.4; 526/318.44; 526/319; 526/322; 526/326; 526/329.3; 526/329.4
(58) Field of Search ................................ 525/191, 222, 525/228, 235, 238, 239, 241; 526/318, 318.1, 318.3, 318.4, 318.44, 319, 322, 326, 329.3, 329.4

(56) References Cited

U.S. PATENT DOCUMENTS 6,084,024 A * 7/2000 Mao et al. .................. 524/556
6,160,057 A * 12/2000 Webster et al. .......... 525/328.9

* cited by examiner

Primary Examiner—Nathan M. Nutter (57) ABSTRACT

The present invention relates generally to compositions prepared by polymerizing vinyl neo $C_9$–$C_{13}$ carboxylic acid esters. Such compositions include latex compositions that are formed by polymerizing vinyl neo $C_9$–$C_{13}$ carboxylic acid esters with ethylenically unsaturated comonomers such as acrylic acid esters and vinyl acetate. The polymer compositions of the present invention are particularly suitable for use in applications such as architectural (both interior and exterior), direct-to-metal and marine coatings and transportation maintenance applications.

14 Claims, 6 Drawing Sheets

POLYMER COMPOSITIONS DERIVED FROM VINYL NEO $C_9$-$C_{13}$ CARBOXYLIC ACID ESTERS

The present invention relates generally to compositions prepared by polymerizing vinyl neo $C_9$–$C_{13}$ carboxylic acid esters. Such compositions include latex compositions that are formed by polymerizing vinyl neo $C_9$–$C_{13}$ carboxylic acid esters with ethylenically unsaturated comoners such as acrylic acid esters and vinyl acetate. The compositions of the present invention are particularly suitable for use in applications such as architectural (both interior and exterior), direct-to-metal and marine coatings and transportation maintenance applications.

BACKGROUND OF THE INVENTION

For exterior coatings, the North American market has been built predominately around all acrylic copolymer systems, typically butyl acrylate/methyl methacrylate systems (BA/MMA systems). Such all acrylic copolymer systems exhibit superior properties such as water resistance and resistance to alkali hydrolysis.

As a way of reducing the cost of an exterior paint, however, these all acrylic copolymer systems are often blended with vinyl acrylic copolymer systems, typically vinyl acetate/butyl acrylate systems (VA/BA systems), to produce a VA/BA+BA/MMA system. As a lower cost alternative to all acrylic copolymer systems for exterior paints, vinyl acetate/butyl acrylate/vinyl ester systems (VA/BA/VE systems) are also known to be used in the North American market. However, these lower cost systems, i.e., VA/BA+BA/MMA systems and VA/BA/VE systems, lack properties such as resistance to alkali hydrolysis, which is a highly desirable property for exterior paints. Therefore, there is a desire to develop a lower cost system with improved performance.

The North American interior coating market has been built predominately around vinyl acrylic systems, typically vinyl acetate/butyl acrylate systems (VA/BA systems). In addition to vinyl acrylic systems, vinyl acetate/vinyl ester systems (VA/VE systems) are known to be used in the European interior coating market. However, VA/BA systems and VA/VE systems that are currently available can be improved in the area of scrub and stain resistance, performance properties that are required for interior paints. Therefore, it is desirable to improve current VA/BA and VA/VE systems to obtain better performance such as scrub and stain resistance for interior coatings.

Finally, in the direct to metal coating market, all acrylic systems such as BA/MMA systems and styrene acrylic systems are used. These systems however do not perform well in the area of corrosion resistance. Therefore, there is a need to find alternate systems that perform well in this area.

SUMMARY OF THE INVENTION

An object of the present invention is to modify a vinyl acrylic system to improve performance properties of exterior paints. A second object of the present invention is to modify a vinyl acetate system to improve performance properties of interior paints and to use such a modified vinyl acetate system as a blended component with an all acrylic system for use in exterior paints. Finally, a third object of the present invention is to modify all acrylic systems to improve performance properties for direct to metal coatings.

The present invention is directed to a polymer prepared by polymerizing a multi-isomer mixture of vinyl neo $C_9$–$C_{13}$ carboxylic acid esters containing at least 25 wt % vinyl neo $C_{12}$ carboxylic acid ester, wherein the vinyl neo $C_9$–$C_{13}$ carboxylic acid is represented by the formula:

wherein $R_1$, $R_2$ and $R_3$ are independently hydrocarbyl groups each having from 1 to 10 carbon atoms, $R_1 R_2 R_3 C'$— has a neo structure about the C' atom, and $R_1+R_2+R_3=7$ to 11; and the vinyl neo $C_{12}$ carboxylic acid ester is represent by the same formula where $R_1+R_2+R_3=10$.

The present invention also provides many additional advantages that shall become apparent from the detailed description of the preferred embodiments below.

DESCRIPTION OF THE PREFERRED EMBODIMENTS

Figure 1:
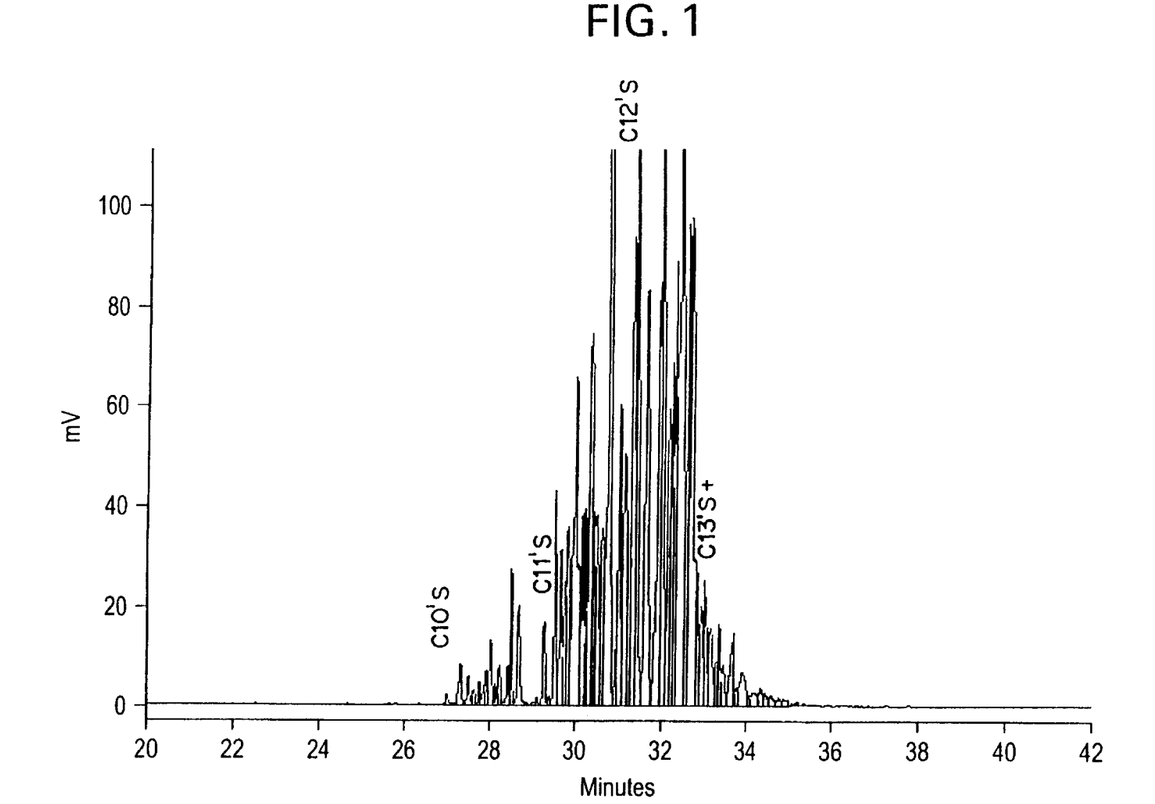
FIG. 1 is a GC pattern for the vinyl neo $C_9$–$C_{13}$ carboxylic acid ester mixture described herein.

A vinyl neo carboxylic acid ester is a derivative of an acid having a neo structure, i.e., an acid having an a, a, a-trisubstituted carbon atom. The vinyl neo carboxylic acid ester mixture used in the present invention (hereinafter referred to as C12VE) is a multi-isomer mixture of vinyl neo $C_9$–$C_{13}$ carboxylic acid esters containing at least 25 wt % and preferably at least 50 wt % vinyl neo $C_{12}$ carboxylic acid ester. In particular, the C12VE typically comprises vinyl neo $C_9$ carboxylic acid ester (neo $C_9$ vinyl ester), vinyl neo $C_{10}$ carboxylic acid ester (neo $C_{10}$ vinyl ester), vinyl neo $C_{11}$ carboxylic acid ester (neo $C_{11}$ vinyl ester), vinyl neo $C_{12}$ carboxylic acid ester (vinyl $C_{12}$ vinyl ester), and vinyl neo $C_{13}$ carboxylic acid ester (neo $C_{13}$ vinyl ester), and is preferably EXXAR™ Neo 12 Vinyl Ester sold by Exxon Chemical Company, having a GC pattern shown in FIG. 1. It is understood that such monomers have various isomeric forms and are typically available as mixtures.

The vinyl neo $C_9$–$C_{13}$ carboxylic acid esters may be represented by the formula:

wherein $R_1$, $R_2$ and $R_3$ are independently hydrocarbyl groups each having from 1 to 10 carbon atoms, $R_1 R_2 R_3 C'$— has a neo structure about the C' atom, and $R_1+R_2+R_3=7-11$. In particular, for the vinyl neo $C_{12}$ carboxylic acid ester, i.e. vinyl neo dodecanoate, $R_1+R_2+R_3=10$ carbon atoms.

The C12VE can be prepared by a catalyzed reaction between a neo $C_9$–$C_{13}$ carboxylic acid mixture and acetylene or vinyl acetate. Processes for the synthesis of vinyl ester are well known and disclosed in U.S. Pat. Nos. 3,285,941, 3,455,998, 3,607,915 and 3,646,077, the contents of which are incorporated herein by reference.

In a first embodiment of the present invention, Applicants have found that a polymer prepared from an ethylenically unsaturated comonomer, an acrylic comonomer, and the C12VE has improved water resistance and resistance to alkali hydrolysis properties. Specifically, Applicants have found that a VA/BA system may be modified by the addition of C12VE to produce a VA/BA/C12VE system that has improved water resistance and resistance to alkali hydrolysis.

Preferably, the polymer of the first embodiment is prepared from a monomeric mixture comprising from about 5 to 95 percent by weight of an ethylenically unsaturated comonomer, from about 5 to 75 percent by weight of an acrylic comonomer, and from about 5 to 75 percent by weight of the C12VE. More preferably, the polymer is prepared from a monomeric mixture comprising from about 30 to 90 percent by weight of an ethylenically unsaturated comonomer, from about 5 to 50 percent by weight an acrylic comonomer, and from about 10 to 50 percent by weight of the C12VE. Specific polymers are prepared from mixtures having monomeric ratios of ethylenically unsaturated comonomer/acrylic comonomer/C12VE of 63/27/10, 56/24/20 or 49/21/30.

In a second embodiment of the present invention, Applicants have found that copolymers prepared from an ethylenically unsaturated comonomer and the C12VE may be incorporated into an interior paint formulation to impart improved scrub and stain resistance to the interior paint. Specifically, Applicants have found that the use of a C12VE to produce a VA/C12VE system results in improved scrub and stain resistance properties.

Preferably the copolymer of the second embodiment is prepared from a monomer mixture comprising from about 30 to 95 percent by weight of an ethylenically unsaturated comonomer and from about 5 to 70 percent by weight of the C12VE. A preferred copolymer is prepared from a mixture having monomeric ratio of ethylenically unsaturated comonomer/C12VE of 85/15.

In a third embodiment of the present invention, Applicants have found that the copolymer prepared from an ethylenically unsaturated comonomer and the C12VE (i.e., a first polymer) may be blended with an all acrylic polymer (i.e., a second polymer) to improve water resistance and resistance to hydrolytic stability. Specifically, Applicants have found that a VA/C12VE system may be blended with all acrylic systems to produce a VA/C12VE+BA/MMA blend that may be used in exterior paints.

Preferably the first polymer of the third embodiment is prepared from a monomer mixture comprising from about 30 to 95 percent by weight of an ethylenically unsaturated comonomer and from about 5 to 70 percent by weight of the C12VE, and the second polymer is prepared from a monomer mixture comprising from about 40 to 90 percent by weight of a first acrylic comonomer and from about 10 to 60 percent by weight of a second acrylic comonomer. A preferred first polymer has a monomeric ratio of ethylenically unsaturated comonomer/C12VE of 85/15, while a preferred second polymer is 70/30. Typically, the first and second polymers are blended in a ratio ranging from 99/1 to 1/99.

In a fourth embodiment of the present invention, Applicants have found the multi-isomer mixture of vinyl neo carboxylic acid esters may be used to modify an all acrylic system prepared from acrylic comonomers to form a corrosion resistant composition. Specifically, Applicants have found that the a multi-isomer mixture of vinyl neo carboxylic acid esters may be polymerized with acrylic comonomers to produce a BA/MMA/VE system for use in direct to metal coatings.

Preferably the latex of the fourth embodiment is prepared from a monomeric mixture comprising from 0 to 5 percent by weight acrylic acid, from about 10 to 60 percent by weight of a first acrylic comonomer, from about 10 to 80 percent of a second acrylic comonomer and from about 10 to 90 percent by weight of the vinyl neo carboxylic acid ester mixture. A preferred latex has a monomeric ratio of 20/20/60.

The ethylenically unsaturated comonomer of the first, second and third embodiments is generally described as vinyl carboxylate comonomer and includes vinyl acetate. Preferably, the ethylenically unsaturated comonomer is selected from the group consisting of vinyl acetate, acrylic acid, methacrylic acid, an ester of acrylic acid, an ester of methacrylic acid, acrylonitrile, vinylidene chloride, styrene, methylstyrene, and a mixture thereof.

The acrylic comonomers of the first, third and fourth embodiments include alkyl (meth)acrylates and (meth)acrylic acid can also be advantageously used. The present copolymers typically include a mixture of several different acrylic monomers including at least one (meth)acrylic acid monomer and one or more alkyl (meth)acrylate ester monomers. The terms "(meth)acrylic" and "(meth)acrylate" in the context of the present invention refer to both acrylic and methacrylic derivatives.

Examples of suitable alkyl (meth)acrylate ester monomers include methyl (meth)acrylate, ethyl (meth)acrylate, propyl (meth)acrylate, n-butyl (meth)acrylate (NBA), 2-ethylhexyl (meth)acrylate, isooctyl (meth)acrylate and the like. Preferred alkyl (meth)acrylate monomers include n-butyl (meth)acrylate and 2-ethylhexyl (meth)acrylate. Examples of suitable alpha, beta-ethylenically unsaturated carboxylic acid monomers include acrylic acid, methacrylic acid, crotonic acid, maleic acid, acid itaconic acid and the like, wherein (meth)acrylic acid is preferred.

Varying amounts of other free radical polymerizable monomers can be employed in the present copolymer including acrylonitrile, vinyl acetate, vinylidene chloride, styrene, methyl styrene, and the like. It should be noted that some commercially available acrylic monomers or monomer mixtures also include minor amounts of acrylonitrile, styrene, vinyl acetate, and the like.

Generally, the reaction of the selected acrylic monomers to form acrylic copolymers proceeds by emulsion polymerization which is a type of polymerization well known to the practitioners in the art. The reaction mixture generally includes an initiator which may be any compound(s) or source for generating free radicals capable of initiating polymerization of the acrylic monomers, such as, for example, azo compounds, persulfates, redox couples and the like Once the reaction is complete, the solids, in the form of a dispersed latex, are allowed to cool to room temperature and the dispersed latex is usually separated from coagulum formed during polymerization by filtration. The dispersed latex may be coated directly onto a substrate film or may be incorporated into a paint or coating formulation that is applied to a substrate film. Suitable substrates include metal, glass, plastic, paper, cloth, wood, pressed wood, polymer film, woven fabric, nonwoven fabric, polyolefin, materials and the like. Examples of metallic substrates in direct to metal application of the fourth embodiment include aluminum, copper and steel, while examples of the plastic substrates include polyesters, polyolefins, polyethylene terephthlate, and the like.

Similar results are anticipated when the above embodiments are prepared by solution polymerization. In this case, all monomers involved are first dissolved in a common solvent, and a solvent-soluble initiator such as azo peroxide, is used to activate the polymerization.

Figure 2:
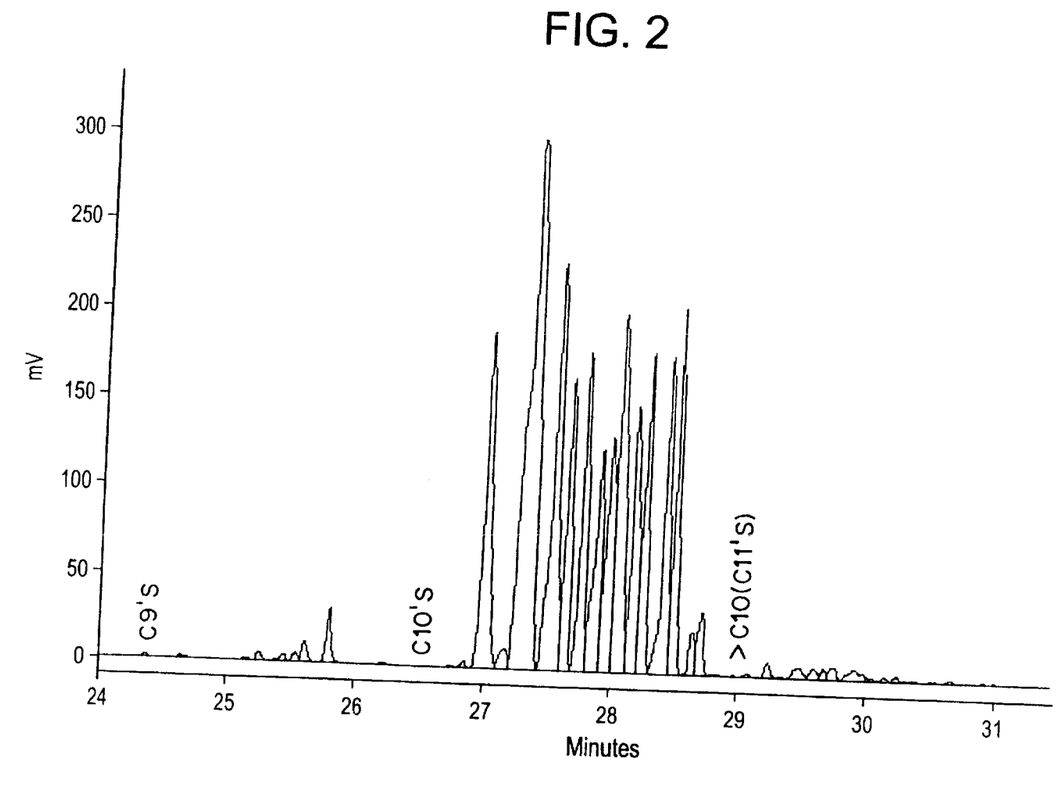
FIG. 2 is a GC pattern for the vinyl neo $C_9$–$C_{12}$ carboxylic acid ester mixture used in the Examples.

The vinyl neo carboxylic acid ester mixture labeled "C12VE" in the following Examples is EXXAR™ Neo 12 Vinyl Ester produced by Exxon Chemical Company. The vinyl neo carboxylic acid ester labeled "C10VE" in Examples 1, 2, 4, 5, 7 and 9 is EXXAR™ Neo 10 Vinyl Ester produced by Exxon Chemical Company, which is a vinyl neo $C_{9-12}$ carboxylic acid ester mixture having 90% or more vinyl neo $C_{10}$ carboxylic acid ester (neo $C_{10}$ vinyl ester) and the GC pattern shown in FIG. 2.

Description of GC Analysis

| | |
|---|---|
| GC | Hewlett-Packard 5890 |
| Detector | Flame Ionization Detector |
| Column | |
| Dimensions | 60 m × 0.32 mm Internal Diameter × 1 µm Film Thickness |
| Stationary Phase | 100% Dimethylpolysiloxane |
| Head Pressure | 13.9 (EPC) |
| Gas Information | |
| Column | |
| Carrier Gas | Helium |
| Flow | 1.7 mls/min |
| Linear Velocity | 24 cm/sec |
| Detector | |
| Make-Up Gas | Helium |
| Flow | 25 mls/min |
| Temperature Information | |
| Injector Temp | 300° C. |
| Detector Temp | 325° C. |
| Oven | |
| Initial Temp | 40° C. |
| Time at Initial Temp | 1 Min |
| Rate of Temp Increase | 5° C./Min |
| Final Temp | 320° C. |
| Time at Final Temp | 15 Min |
| Split Ratio | 90/1 |
| Sample Size | 0.5 microliter |

EXAMPLE 1

A. General Procedure for Colloid Stabilized (CS) Latex Preparation

A colloid-stabilized (CS) latex recipe is given in Table 1. The latex reactor system included a cylindrical kettle (1 liter) equipped with an inlet for nitrogen purge, condenser and mechanical stirrer. The system was connected to a Camille 2000 automated monomer feeding assembly. The reaction kettle was flushed with nitrogen for 30 minutes. A kettle charge, comprising a colloid, surfactant, initiator and deionized (DI) water, was added to the kettle and the reaction mixture was purged with nitrogen for 30 minutes. The reaction mixture was stirred at a speed of 300 r.p.m. maintaining the temperature at 75° C. About 10% of the monomer mixture were added as an initial seed. After 30 minutes, the monomer mixture and the initiator solution were fed separately to the reaction zone. The addition time of the monomer mixture was 3 hours and that of the initiator solution was 3.5 hours. After addition of the initiator solution was complete, the reaction mixture was post reacted for an additional 1 hour to ensure complete reaction. After determining the solids content of the latex, the reaction mixture was cooled and filtered through a fine filter to produce a stable latex.

TABLE 1

COLLOID-STABILIZED LATEX RECIPE

| | Weight (g) |
|---|---|
| Initial Reactor Charge | |
| DI Water | 428.00 |
| Cellosize QP 300 | 6.00 |
| Tergitol NP-40 (nonionic surfactant) | 6.00 |
| Tergitol NP-15 (nonionic surfactant) | 7.80 |
| Rhodocal DSA (anionic surfactant) | 6.60 |
| Ammonium Bicarbonate | 1.20 |
| Ammonium Persulfate | 0.48 |
| Monomer mixture | |
| Vinyl Acetate | 333.00 |
| C12VE | 120.00 |
| Butyl Acrylate | 142.00 |
| Initiator solution | |
| DI Water | 100.00 |
| Ammonium Persulfate | 1.20 |
| Total | 1157.28 |

B. General Procedure for Surfactant Stabilized (SS) Latex Preparation

The surfactant-stabilized (SS) latexes were synthesized by a slightly modified procedure. A pre emulsion solution is prepared by mixing the surfactant, monomers and DI water with a high-speed stirrer at 500 r.p.m. for a period of 15 minutes. This pre emulsion solution replaces the monomer mixture of the colloid-stabilized procedure of Example 1, Part A. A detailed recipe is given in Table 2.

TABLE 2

SURFACTANT-STABILIZED LATEX RECIPE

| | Weight (g) |
|---|---|
| Initial Reactor Charge | |
| DI water | 170.00 |
| Rhodocal DS-4 (anionic surfactant) | 3.60 |
| Ammonium bicarbonate | 0.24 |
| Ammonium Persulfate | 0.48 |
| Pre Emulsion | |
| Solution A | |
| DI water | 318.00 |
| Rhodocal DS-4 (anionic surfactant) | 3.00 |
| Tergitol NP-40 (nonionic surfactant) | 6.00 |
| Tergitol NP-15 (nonionic surfactant) | 7.80 |
| Ammonium bicarbonate | 0.96 |
| Solution B | |
| Vinyl Acetate | 329.00 |
| C12VE | 120.00 |
| Butyl Acrylate | 145.00 |
| Acrylic Acid | 6.00 |
| Initiator Solution | |
| DI water | 100.00 |
| Ammonium Persulfate | 1.20 |
| Total | 1211.28 |

Latex samples prepared according to the colloid stabilized and surfactant stabilized latex preparation methods are described in Table 3.

TABLE 3

LATEX SAMPLES

| Latex Code | Monomer | | | | |
|---|---|---|---|---|---|
| | C10VE | C12VE | Vinyl Acetate | Butyl Acrylate | Acrylic Acid |
| CS12 | 0 | 0 | 69.5 | 30.5 | 0 |
| CS15 | 10 | 0 | 63 | 27 | 0 |
| CS13 | 20 | 0 | 56.33 | 23.67 | 0 |
| CS17 | 30 | 0 | 49.67 | 20.33 | 0 |
| CS16 | 0 | 10 | 63 | 27 | 0 |
| CS14 | 0 | 20 | 56.33 | 23.67 | 0 |
| CS18 | 0 | 30 | 49.67 | 20.33 | 0 |
| SS13 | 0 | 0 | 68 | 31 | 1 |
| SS16 | 10 | 0 | 61.5 | 27.5 | 1 |
| SS14 | 20 | 0 | 54.83 | 24.17 | 1 |
| SS18 | 30 | 0 | 48.17 | 20.83 | 1 |
| S517 | 0 | 10 | 61.5 | 27.53 | 1 |
| SS15 | 0 | 20 | 54.83 | 24.17 | 1 |
| SS19 | 0 | 30 | 48.17 | 20.83 | 1 |

EXAMPLE 2

The particle size of the latex samples described in Table 3 was measured using a Coulter N4MD sub-micron particle size analyzer. Minimum Filming Temperature (MFT) was determined using a Paul Gardner MPT Bar 90. These properties are shown in Tables 4 and 5.

TABLE 4

COLLOID STABILIZED LATEX SAMPLES

| Wet Latex Properties | CS12 | CS15 | CS16 | C13 | C14 | CS17 | CS18 |
|---|---|---|---|---|---|---|---|
| Vinyl Ester | None | C10VE | C12VE | C10VE | C12VE | C10VE | C12VE |
| Amount (wt %) | 0% | 10% | 10% | 20% | 20% | 30% | 30% |
| % Solids | 54.1 | 53.9 | 53.9 | 53.9 | 54.0 | 51.2 | 52.8 |
| Particle size, ±24 nm | 375 | 385 | 367 | 394 | 361 | 3341 | 386 |
| MFT (° C.) | 4 | 3 | 2 | 2 | 2 | −0.4 | −0.4 |

TABLE 5

SURFACTANT STABILIZED LATEX SAMPLES

| Wet Latex Properties | SS13 | SS16 | SS17 | SS14 | SS15 | SS18 | SS19 |
|---|---|---|---|---|---|---|---|
| Vinyl Ester | None | C10VE | C12VE | C10VE | C12VE | C10VE | C12VE |
| Amount (wt %) | 0% | 10% | 10% | 20% | 20% | 30% | 30% |
| % Solids | 50.3 | 50.1 | 50.6 | 50.5 | 50.3 | 50.0 | 50.6 |
| Particle size, ±6 nm | 135 | 139 | 144 | 138 | 136 | 151 | 154 |
| MFT (° C.) | 2 | 1 | 1 | 1 | 1 | −0.5 | −0.5 |

EXAMPLE 3

A sample exterior flat house paint formulation is described in Table 6. The latex used in an exterior paint formulation may be any of the latex samples described in Table 3.

TABLE 6

Sample Exterior Flat House Paint

| | |
|---|---|
| 2.5% QP-4400 solution | 10.39 |
| Water | 8.32 |
| Mix, then add: | |
| Ethylene glycol | 5.40 |
| Colloid 226-35 | 0.84 |
| KTPP | 0.13 |
| Triton CF-10 | 0.21 |
| Colloid 643 | 0.08 |
| AMP-95 | 0.08 |
| Mix for 5 minutes, then add: | |
| TiO$_2$ R-902 | 19.00 |
| Eagle Zinc 471W | 2.11 |
| Minex 4 | 12.24 |
| Optiwhite | 4.22 |
| Attagel 50 | 0.42 |
| Grind to 6+ Hegman | |
| Latex (53.5% solids) | 31.44 |
| Texanol | 1.58 |
| Skane M-8 | 0.08 |
| Colloid 643 | 0.12 |
| Ammonia | 0.16 |
| 2.5% Cellosize 15M | 3.17 |
| Water | 0.00 |
| | 100.00 |
| Paint Properties | |
| Pigment % | 38.0 |
| Latex solids % | 16.9 |
| Total solids % | 55.5 |
| PVC % | 44.8 |

EXAMPLE 4

Texanol® (10 parts per hundred rubber based on % latex solids) was added to some of the colloid stabilized latex samples described in Table 3. The latex samples were vigorously shaken on vortex shaker and latex films of 4 mil wet film thickness were drawn on polypropylene panels using a draw down bar. The films were dried at room temperature for a week. The dried films were cut to about 7 cm×1.5 cm specimens, weighed and soaked in deionized water (20 ml) for 7 days. The films were then removed from water, patted dry with a lint free filter paper and weighed. The weight of water absorbed was reported as percentage weight gain.

TABLE 7

WATER ABSORPTION MEASUREMENTS OF COLLOID STABILIZED LATEX FILMS AND COMMERCIAL LATEX FILMS

| Latex Codes | % Percent Ester | % Weight Gain upon Immersion in Water |
|---|---|---|
| Commercial vinyl-acrylic[a] | 0 | 180.73 |
| CS12 (VA/BA) | 0 | 117.97 |
| CS15 (VA/BA/C10VE) | 10% C10VE | 87.19 |
| CS16 (VA/BA/C12VE) | 10% C12VE | 81.54 |
| CS13 (VA/BA/C10VE) | 20% C10VE | 71.33 |
| CS14 (VA/BA/C12VE) | 20% C12VE | 62.61 |
| CS17 (VA/BA/C10VE) | 30% C10VE | 51.95 |
| CS18 (VA/BA/C12VE) | 30% C12VE | 49.37 |
| Commercial all-acrylic[b] | 0 | 39.26 |
| Lab all-acrylic (BA/MMA) | 0 | 52.34 |

[a]UCAR ® 379G by Union Carbide
[b]RHOPLEX MULTILOBE 200 by Rohm and Hass

Water absorption measurements for latex films prepared from VA/BA/C12VE systems and some commercial latexes are shown in Table 7. As shown in Table 7, incorporation of a C12VE into a VA/BA system produces a latex film that exhibits decreased water uptake compared to a latex film produced from a VA/BA system or VA/BA/C10VE system having the same amount of vinyl ester. Moreover, as the percentage of C12VE is increased, the water uptake values of a latex film derived therefrom decreases and approaches the water uptake values of all acrylic systems. Improved water resistance properties of the VA/BA/C12VE latex film translates into better weatherability for exterior paints, which is a key performance need for exterior coatings.

EXAMPLE 5

Alkali hydrolysis tests were carried out on wet latexes by addition of 50 ml of 1N NaOH to 5 g of latex, and then titrating 5 ml of the mixture against standard HCI to determine the alkali consumed after 4, 24, 48, and 72 hours. The results are reported as % NaOH consumed by the latex. The alkali hydrolysis study of wet latexes is shown in FIGS. 3–5.

Figure 3:
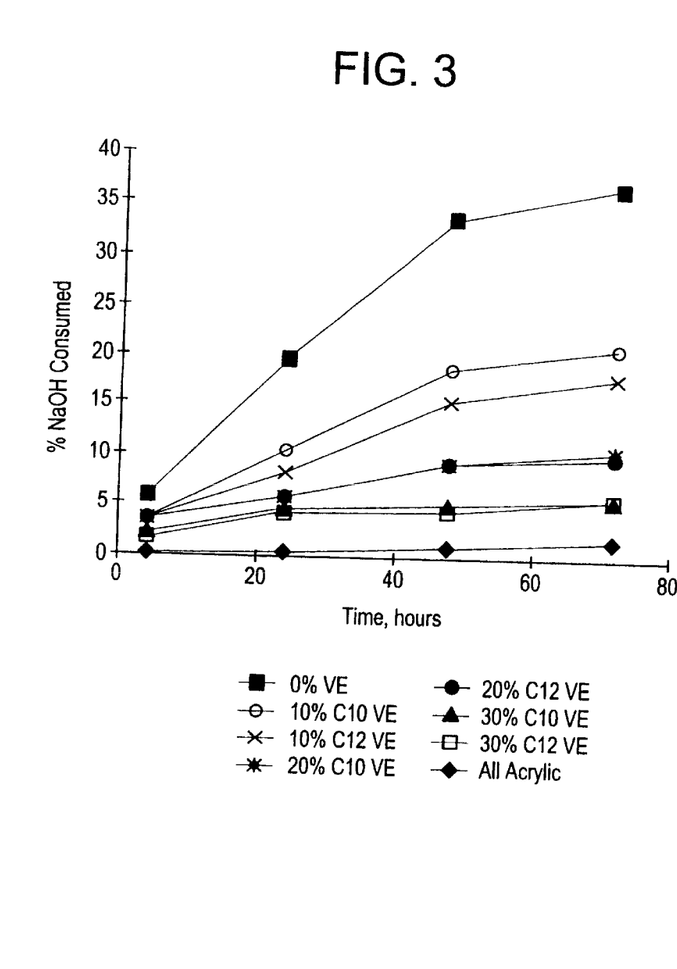
FIG. 3 schematically illustrates alkali hydrolysis test results of colloid-stabilized latexes.

Referring to FIG. 3, depicting alkali hydrolysis test results of colloid stabilized latexes, it can be seen that the VA/BA/C12VE system latexes that had the C12VE incorporated into the latex at a level about 30% by weight, had a stability approaching the stability of an all acrylic system.

Figure 4:
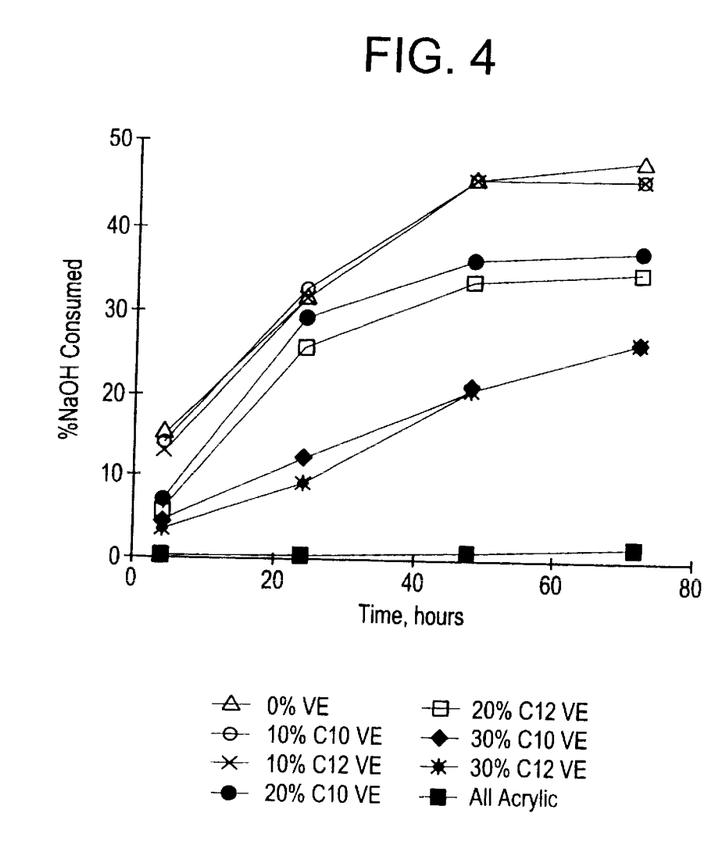
FIG. 4 schematically illustrates alkali hydrolysis test results of surfactant-stabilized latexes.

Referring to FIG. 4, depicting alkali hydrolysis test results of surfactant stabilized latexes, it can be seen that the VA/BA/C12VE system latexes which had the C12VE incorporated therein, showed an improvement in the hydrolytic stability of the latex.

Figure 5:
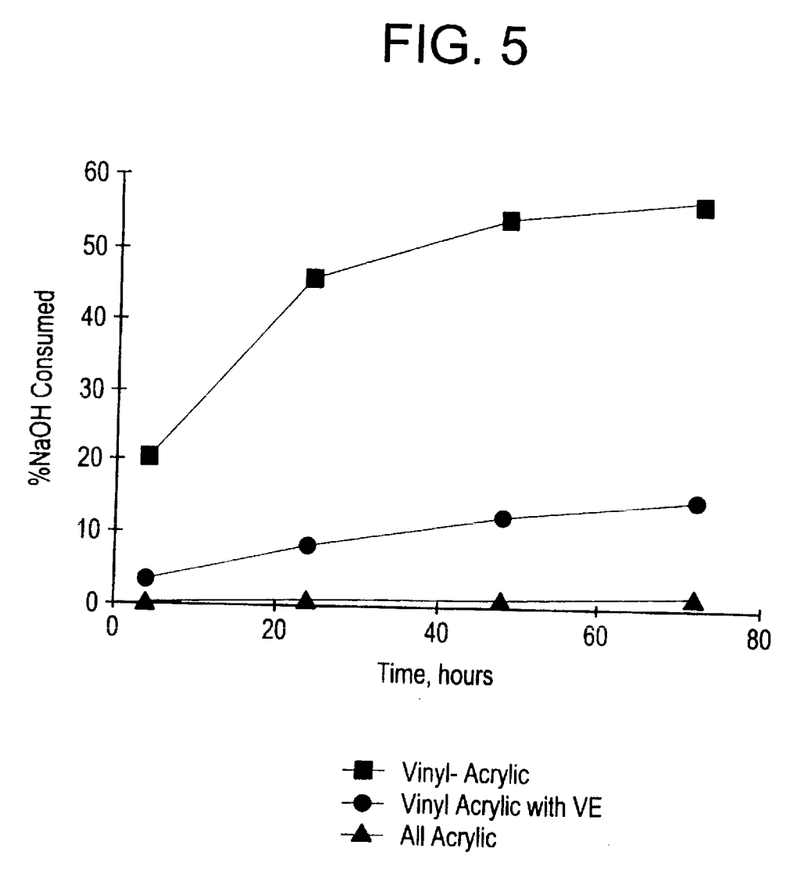
FIG. 5 schematically illustrates alkali hydrolysis test results of commercial latexes.

Referring to FIG. 5, depicting alkali hydrolysis test results of commercial latexes, a similar improvement in the hydrolytic stability of the latex was observed.

Colloid stabilized latexes generally performed better than the surfactant stabilized systems. The performance of the surfactant stabilized systems may have suffered to some extent due to the presence of acrylic acid, which may have facilitated the hydrolysis of ester groups. In contrast, in the colloid stabilized systems, both absence of acrylic acid and presence of grafting at the cellulose sites of the colloid may have improved the overall hydrolytic stability of the colloid stabilized systems.

It is believed that the trialkyl branching of the C12VE provides steric hindrance, which contributes to the alkali resistance and overall strength of polymer. Without being bound by any theory or structure, it is believed that the steric hindrance of the vinyl neo $C_9$–$C_{13}$ carboxylic acid esters deter the approach of alkali to the ester sites. This effect protects the ester groups from hydrolysis, thus improving their stability when exposed to environmentally harsh conditions. Hence, the vinyl neo $C_9$–$C_{13}$ carboxylic acid esters can be used as protective monomers to provide shielding of the acetate groups from alkali attack and subsequent hydrolysis.

EXAMPLE 6

A latex for interior paints may be prepared according to the colloid stabilized latex preparation method described in Example 1, using the VA/C12VE system of the present invention. A sample interior paint formulation incorporating such a latex is described in Table 8.

TABLE 8

Interior Paint Formulation
(60 PVC Paint)

| Raw Material | Description | Pounds |
| --- | --- | --- |
| Water | DI Water | 277 |
| KTPP | Potassium Tri-Polyphosphate | 2 |
| Nuosept 95 | Preservative | 1.5 |
| Colloid 640 | Defoamer Mineral Oil | 2 |
| Tergitol NP-9 | Surfactant | 4 |
| AMP-95 | Buffer/Dispersant | 1.5 |
| Tamol 850 | Dispersant | 7 |
| Cellosize QP-15000 | Rheological - HEC | 2.5 |
| Ti-Pure R-902 | TIO2 | 283 |
| Eagle Zinc-Oxide 417W | Bi-Functional Pigment | 65 |
| Eagle Pitcher Imsil A-25 | Silica Filler | 168 |
| Celatom MW-27 | Diatomatios Earch (Silica) | 25 |
| Water | DI-Exxon | 136.45 |
| Natrosol Plus 330 | HEC-Rheological | 4 |
| Propylene Glycol | Anti-Freeze | 30 |
| Colloid 640 | Mineral-Oil Defoamer | 2 |
| Texanol | Coalescent Solvent | 14 |
| Latex | | 188.96 |

EXAMPLE 7

Scrub resistance is a key property for interior paints. The test used to measure scrub resistance involves subjecting paint that is coated on a substrate to abrasion, usually by rubbing a brush onto the substrate. ASTM method number D2486–89, entitled "Scrub Resistance of Wall Paints," was used for testing the scrub resistance of the coatings tested. Scrub resistance properties of VA/C12VE system based interior paints vs. VA/C10VE system based interior paints and VA/BA system based interior paints at various PVC levels are shown in Table 9. The interior paints of Table 9 were prepared similarly to the sample paint formulation described in Table 8.

TABLE 9

Scrub Testing of Interior Coatings

| Experiment Number | PVC[a] | 50% | 60.5% | 65% |
| --- | --- | --- | --- | --- |
| (1) | Vinyl Acetate/C12VE (85/15)[b] | 1351.0 | 387.0 | 236.0 |
|  | Vinyl Acetate/C10VE (85/15)[b] | 1266.0 | 395.0 | 211.0 |
| (2) | Vinyl Acetate/C12VE (85/15)[c] | 1359.0 | 452.0 | 216.0 |
|  | Vinyl Acetate/C10VE (85/15)[c] | 1321.0 | 408.0 | 212.0 |
| (3) | Vinyl Acetate/C12VE (85/15)[c] | 979.0 | 402.0 | 242.0 |
|  | Vinyl Acetate/Butyl (80/20)[c] | 811.0 | 286.0 | 179.0 |

[a]PVC = Pigment Volume Concentration.
[b]Scrub test was carried out side by side by itself.
[c]Scrub test was carried out side by side with another material.

Experiment No. (1)

The scrub test for Experiment No. 1 was conducted by coating a VA/C12VE system based interior paint onto two halves of a substrate. The two halves were subjected to abrasion that traversed the two halves until the paint in both halves had been worn through to the substrate. This procedure of coating/abrasion was repeated three times for a total of six VA/C12VE samples (each sample coated onto one half of a substrate). The number of cycles of abrasion for each of the six VA/C12VE samples was averaged to yield the numbers 1351.0, 387.0 and 236.0.

The coating/abrasion procedure was repeated three times for a total of six VA/C10VE samples (each sample coated onto one half of a substrate). The number of cycles of abrasion for each of the six VA/C10VE samples was averaged to yield the numbers 1266.0, 395.0 and 211.0.

Experiment Nos. (2) and (3)

The scrub test for Experiment Nos. (2) and (3) were conducted by coating, for example, a VA/C12VE system based interior paint onto one half of a substrate, and a VA/C10VE system based interior paint onto the other half of the substrate. The two halves were subjected to abrasion that traversed the two halves until the paint in both halves had been worn through to the substrate.

This procedure of coating/abrasion was repeated two times, each time alternating the position of the VA/C12VE and VA/C10VE systems on the halves of the substrate, for a total of two VA/C12VE and two VA/C10VE systems. The number of cycles for abrasion for each of the two VA/C12VE and two VA/C10VE systems was averaged to yield the numbers set forth in Table 9.

As can be seen from Table 9, interior paints prepared from a VA/C12VE system have unexpectedly improved scrub resistance compared to interior paints prepared from a VA/C10VE system or a VA/BA system.

Data for stain resistance of interior paints prepared from a VA/C12VE system, a VA/C10VE system and a VA/BA system is shown below in Table 10.

TABLE 10

K & N Stain for Porosity

| % PVC | 50 | 51.95 | 53.9 | 56 | 58.25 | 60.5 | 62.75 | 65 |
|---|---|---|---|---|---|---|---|---|
| VA/BA (80/20) | 10.05 | 11.51 | 12.07 | 14.28 | 15.08 | 16.67 | 18.89 | 19.29 |
| VA/C10VE (85/15) | 6.61 | 7.8 | 9.33 | 11.03 | 13.31 | 14.66 | 16.66 | 17.31 |
| VA/C12VE (85/15) | 7.51 | 9.23 | 10.47 | 10.67 | 12.32 | 13.73 | 14.43 | 15.54 |

As shown in Table 10, the porosity of an interior paint based on a VA/C12VE system is superior to that of a paint based on a VA/BA system. Improved porosity using a VA/C12VE system translates into improved stain resistance for interior paints, which is a key performance need in interior paints.

EXAMPLE 8

Figure 6:
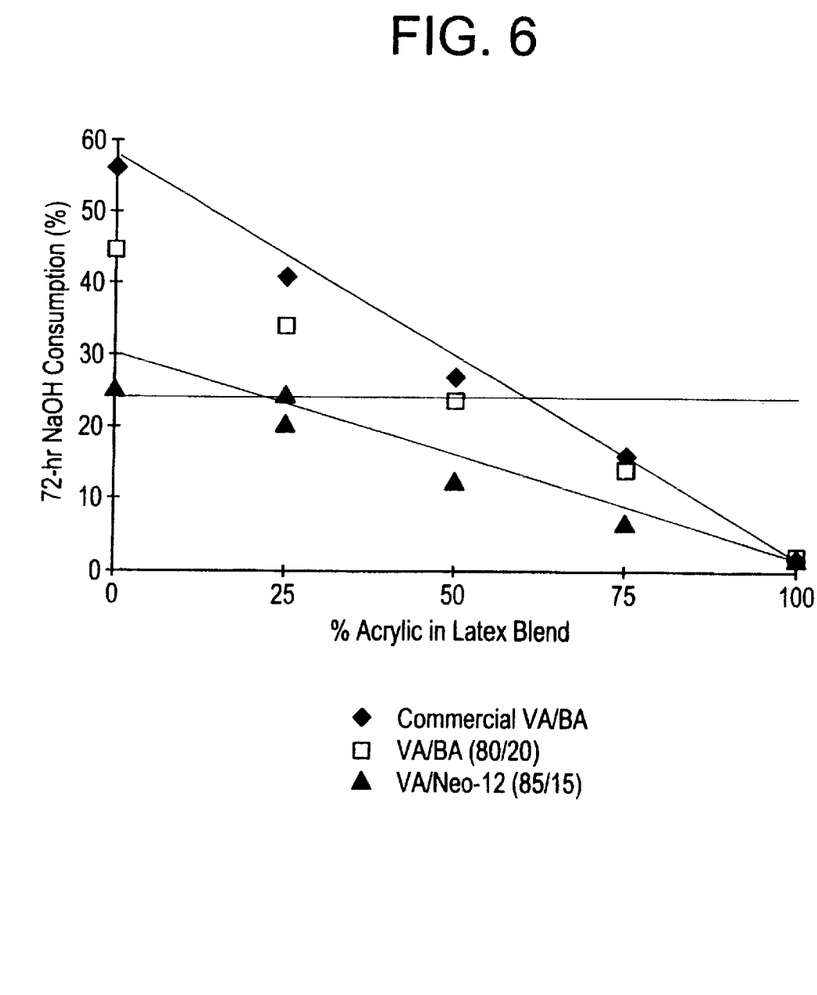
FIG. 6 illustrates the alkali hydrolysis test results of a VA/C12VE+BA/MMA system.

The VA/C12VE system described in Example 7 may be blended with an all acrylic system. Improved resistance to alkali hydrolysis is demonstrated for wet latexes prepared from VA/C12VE (having a ratio of 85/15)+BA/MMA blends compared to wet latex prepared from VA/BA (having a ratio of 80/20)+BA/MMA blends. The blends according to the present invention approaches the resistance of an all acrylic system to alkali hydrolysis when blended in increasing ratios of VA/C12VE to BA/MMA. These results are shown in FIG. 6, where the commercial VA/BA product is UCAR® 379G by Union Carbide, the all acrylic product is RHOPLEX MULTILOBE 200 by Rohm and Haas, and the "VA/BA (80/20)" is a VA/BA system having a monomeric ratio of 80/20.

EXAMPLE 9

Latex for direct to metal application may be synthesized similarly to the surfactant stabilized latex preparation described in Example 1. Sample latexes having varying amounts of C10VE or C12VE are shown in Table 11. Corrosion testing was performed by preparing panels for corrosion testing using the wet latex along with 10 parts per hundred rubber Texanol® and 0.5 parts per hundred rubber urethane thickener (based on % solids), and 0.1% sodium nitrate solution to prevent flash rusting of the panels. Latex films of 6 mil wet film thickness were drawn down on cold-rolled steel panels using a draw down bar. The panels were dried at room temperature for 4 h and then at 60° C. for 2 days. Dried panels were scribed in the middle and placed in the salt fog chamber. Panels were removed after 250 h and evaluated for corrosion. All of the latexes possessed good corrosion resistance. Table 12 shows that for latex coatings with similar $T_g$, the scribe failure rating improved on increasing the vinyl ester content from 30 to 60%. Incorporation of more vinyl ester improved the blister ratings with the C10VE and C12VE homopolymers showing very few blisters. Corrosion resistance properties of the latex films are shown in Table 12, which demonstrates improved corrosion resistance properties over an all acrylic system i.e. Morkote 1001.

TABLE 11

DIRECT TO METAL COATINGS STUDY

Vinyl Ester - Acrylic Latex Compositions

| Monomers (%) | NA02 | NA03 | NA05 | NA06 | NA12 | NA13 |
|---|---|---|---|---|---|---|
| C10VE | 30 | | 60 | | 60 | |
| C12VE | | 30 | | 60 | | 60 |
| MMA | 45.6 | 45.6 | 32.9 | 32.9 | 22.5 | 22.5 |
| BA | 23.4 | 23.4 | 6.9 | 6.9 | 16.5 | 16.5 |
| AA | 1 | 1 | 1 | 1 | 1 | 1 |

TABLE 12

DIRECT TO METAL COATINGS STUDY (Continued)
Corrosion Resistance Study of Vinyl Ester - Acrylic Latex Coatings (Clear Film) on Steel Panels

| Sample Code | % Vinyl Ester | Failure Rating at Scribe After 250h | Failure Rating at Scribe After 500h | Blister Ratings after 250h | Blister Ratings after 500h |
|---|---|---|---|---|---|
| NAO2 | 30% C10VE | 6 | 5 | 3, med | 1, med den |
| NAO3 | 30% C12VE | 6 | 5 | 3, med | 1, med den |
| NAO5 | 60% C10VE | 6 | 5 | 3, med | 1, med |
| NAO6 | 60% C12VE | 6 | 5 | 3, med | 1, med |
| NA12 | 60% C10VE | 6 | 5 | 2, few | 1, med |
| NA13 | 60% C12VE | 6 | 5 | 2, few | 1, med |
| C10VE Homo | 100% C10VE | 6 | 5 | 1, few | 1, few |
| C12VE Homo | 100% C12VE | 6 | 6 | 1, few | 1, few |
| Morkote 1001 | — | 7 | 7 | 1, few | 1, few |

While we have shown and described several embodiments in accordance with our invention, it is to be clearly understood that these embodiments are susceptible to numerous changes and variations that are apparent to one skilled in the art. Therefore, we do not wish to be limited to the details shown and described but intend to show all changes and modifications, which come within the scope of the appended claims.

What is claimed is:

1. A polymer prepared by polymerizing a monomer mixture comprising a multi-isomer mixture of vinyl neo $C_9$–$C_{13}$ carboxylic acid esters containing at least 25 wt % vinyl neo $C_{12}$ carboxylic acid esters, wherein said vinyl neo $C_9$–$C_{13}$ carboxylic acid esters are represented by the formula:

wherein $R_1$, $R_2$ and $R_3$ are independently hydrocarbyl groups each having from 1 to 10 carbon atoms, $R_1R_2R_3C'$— has a neo structure about the C' atom, and that $R_1+R_2+R_3$= from 7 to 11 carbon atoms.

2. The polymer according to claim 1, wherein said multi-isomer mixture of vinyl neo $C_9$–$C_{13}$ carboxylic acid esters contains at least 50 wt % vinyl neo $C_{12}$ carboxylic acid esters.

3. The polymer according to claim 1, wherein said monomer mixture further comprises an ethylenically unsaturated comonomer.

4. The polymer according to claim 3, wherein said ethylenically unsaturated comonomer is selected from the group consisting of: an acrylic comonomer, vinyl acetate, vinylidene chloride, styrene, methylstyrene, and a mixture thereof.

5. The polymer of claim 4, wherein said ethylenically unsaturated comonomer is an acrylic comonomer selected from the group consisting of: acrylic acid, methacrylic acid, an ester of acrylic acid, an ester of methacrylic acid, acrylonitrile, and a mixture thereof.

6. The polymer of claim 5, wherein said acrylic comonomer is selected from the group consisting of butyl acrylate, methyl methacrylate, and a mixture thereof.

7. The polymer of claim 4, wherein said acrylic comonomer comprises a first acrylic comonomer and a second acrylic comonomer.

8. The polymer of claim 7, wherein said first acrylic comonomer is butyl acrylate and said second acrylic comonomer is methyl methacrylate.

9. The polymer of claim 3, wherein said polymer comprises:
   (a) between about 5 to 70 percent by weight of said multi-isomer mixture of vinyl neo $C_9$–$C_{13}$ carboxylic acid esters; and
   (b) between about 30 to 95 percent by weight of said ethylenically unsaturated comonomer.

10. A composition comprising:
    (a) a first polymer prepared by polymerizing monomer mixture comprising a multi-isomer mixture of vinyl neo $C_9$–$C_{13}$ carboxylic acid esters containing at least 25 wt % vinyl neo $C_{12}$ carboxylic acid esters, wherein said vinyl neo $C_9$–$C_{13}$ carboxylic acid esters are represented by the formula:

wherein $R_1$, $R_2$ and $R_3$ are independently hydrocarbyl groups each having from 1 to 10 carbon atoms, $R_1R_2R_3C'$— has a neo structure about the C' atom, and that $R_1+R_2+R_3$=from 7 to 11 carbon atoms; and an ethylenically unsaturated comonomer; and
    (b) a second polymer prepared by copolymerizing a first acrylic comonomer and a second acrylic comonomer.

11. The composition of claim 10, wherein said ethylenically unsaturated comonomer is vinyl acetate.

12. The composition of claim 11, wherein said first acrylic comonomer is butyl acrylate and said second acrylic comonomer is methyl methacrylate.

13. The composition of claim 10, wherein said first polymer is prepared by polymerizing a monomer mixture comprising: from about 5 to 70 percent by weight of said multi-isomer mixture of vinyl neo $C_9$–$C_{13}$ carboxylic acid esters; and from about 30 to 95 percent by weight of said ethylenically unsaturated comonomer; and wherein said second polymer is prepared by copolymerizing a monomer mixture comprising from about 40 to 90 percent by weight of said first acrylic comonomer and from about 10 to 60 percent by weight of said second acrylic comonomer.

14. The composition of claim 10, wherein said first polymer and said second polymer are blended in a ratio from 99/1 to 1/99.

* * * * *